United States Patent Office 3,259,504
Patented July 5, 1966

3,259,504
PROCESS OF LOWERING THE VISCOSITY OF GARLIC PUREE AND PRODUCT OBTAINED THEREBY
Peter P. Noznick and Robert H. Bundus, Chicago, Ill.
No Drawing. Filed June 5, 1964, Ser. No. 373,106
15 Claims. (Cl. 99—106)

This application is a continuation-in-part of application Serial No. 191,455 filed May 1, 1962.

This invention relates to a new and improved garlic concentrate and powder and to a process of preparing the same from raw garlic (allium sativum). As is well known, garlic is cultivated throughout the world, and the bulb has a strong and characteristic odor and an acrid taste. While it yields an offensively smelling oil, essence of garlic, the product is highly prized as a seasoning and flavoring and has become an established article of diet.

The invention will be illustrated in the following examples.

Example 1

Frozen raw garlic is pulverized in the skins through a suitable means such as a Fitzpatrick Hammer Mill and while in a frozen condition the pulverized garlic is then centrifuged at high speed, thereby separating the juice and pulp. A suitable filter aid such as "Pressaid L" is used to facilitate extraction. The juice is then spray dried.

Room temperature garlic can be used at the sacrifice of some flavor due to volatilization, according to this example.

Example 1a

Instead of spray drying, as in the previous example, a binder, diluent and flavor entrapping agent (as otherwise the product is very potent), such as gum acacia, 20% by weight, is first added to the juice, and then the mixture is spray dried.

Example 1b

The pulp from the above processing in Examples 1 or 1a is mixed with hot water and recentrifuged, the effluent being added to the original juice of the prior examples before spray drying.

Examples 1c, 1d (1c) A sterile product is made by high temperature sterilization of the juice from Examples 1 and 1a, respectively (240° W. for 16 seconds) in a tubular heater i.e. indirect heat transfer means, such as a conventional heat exchanger. Thus, a sterilized whole garlic product from Examples 1 or 1b is formed which may be spray dried, as described.

(1d) The 80% product containing 20% gum acacia of Example 1a as described above, also is sterilized and then spray dried.

Products prepared in accordance with the foregoing examples are concentrates either in the form of the juice or the spray dried product, i.e., a powder. In all instances, the concentrates have an enhanced fresh garlic flavor and a greater flavoring strength at least three or four times stronger than currently existing products.

In referring to grinding and centrifuging the prefrozen broken up or pulverized garlic bulb at low temperatures, we mean from about 50° below 0° up to about 0°, the lower the temperature, the better.

Example 1e

The centrifuging step in the prior examples is carried out in the presence of $CO_2$, if desired.

Otherwise, the operation are the same as in the previous examples.

Example 1f

Pulverized raw garlic as in Example 1 is centrifuged without the use of a filter aid. The juice is spray dried with a binder, for example, gum acacia, and the pulp is roller dried. The resultant roller dried powder is reblended with powder resulting from the spray drying, the temperature of the roller dryer being 285° F. A range of 270° to 320° F. was used successfully.

Example 1g

In this example the garlic bulbs are not frozen. They are broken under mild pressure into individual cloves. The cloves are winnowed at 140° F. in warm air, such as an air blast having that temperature, with mechanical attrition such as a hammer mill or brushing apparatus sufficient to remove the skins without damage to the cloves. The mixture of skins, roots and cloves is then mechanically classified by any conventional classifier to thereby separate clean cloves from the roots and skins. The clean cloves are then washed in tap water or cool water and ground with a suitable size reduction device of a conventional character to a particle size of approximately .040 inch or less. A slurry is thus produced which is then digested with a cellulose digesting enzyme, that is, an enzyme which will reduce viscosity, and we have used successfully in this and similar examples enzymes such as "Cellulase 35" of Rohm & Haas, Pectinase and Amylase, respectively. In the present example, "Cellulase 35" was used, and the digestion took place at approximately 120° F. for 30 minutes, thereby reducing viscosity and altering the composition of the garlic so that desirable heat treatment may subsequently be employed without detrimental increase in viscosity or formation of a gel-like structure. The slurry is then further size reduced by mechanical means and heated in a stainless steel tubular heat exchanger bringing the temperature to 160° F.–240° F., in the present instance 190° F., and holding for about 4 minutes, followed by cooling to 70° F. and preferably lower. This relatively high heating process is very desirable to (1) destroy bacteria, (2) stabilize the color, and (3) destroy enzyme activity. Raw puree or slurry is adjusted to contain about 30% total solids by adding water in the enzyme digesting vessel. The heat treated puree is then spray dried directly to produce a powder. In a modification of this example the raw or heat treated puree was mixed with about 10% sodium chloride resulting in a salt preserved puree containing about 37% total solids and about 10% salt. The digestion was done in a vapor tight vat.

Example 1h

This example is the same as Example 1g. However, the raw puree in the vapor-tight enzyme digestion vat was heated to 140° F., 165° F. and 190° F., respectively, for about 5, 15, and 30 minutes, respectively, the time being inversely proportional to the temperature, i.e., the higher the temperature the lower the heating time, cooled and enzyme digested as in Example 1g. The purpose of this step is to make the gums more readily digestable by the enzyme, i.e. the gums present in the puree.

The process of these Examples 1g and 1h and the variations referred to above has notable advantages over conventional methods of garlic powder production in that (1) complete enzyme activity is achieved prior to dehydration resulting in a powder of a high, uniform and stable flavor level, (2) the heat treatment greatly reduces bacterial population and (3) flavor substances are enzymatically produced and retained that result in a powder three to four times the flavoring strength of garlic powder produced from the same raw material by conventional methods of chip dehydration followed by grinding to a powder.

Referring to Example 1f above, this has been carried out without the use of a binder such as gum acacia with satisfactory results, the process being otherwise the same as Example 1f.

Referring to Examples 1g and 1h, the winnowing in the warm air blast may be done with the air at a temperature between about 135°–145° F., and the particle size of .040 inch is substantially the maximum size and preferably the particle size is less. The enzymatic digestion in Example 1g is satisfactorily carried out at temperatures from approximately 115° F. to 130° F. for 10–40 minutes, the higher the temperature, the lower the heating time.

As stated, this process 1g and 1h, while described in connection with "Cellulase 35" of Rohm & Haas, was also conducted using a viscosity reducing enzyme such as Pectinase in a similar example and Amylase in a similar example.

In referring to a temperature range of 160° F.–240° F. and holding for about 4 minutes, it is to be understood that this time period may be reduced to 2 minutes at the increased temperature and raised to 10 minutes where the temperature is reduced. The preferred temperature range and time period range is 180° F.–220° F. for about 3 to 4 minutes. The subsequent cooling is to room temperature for most purposes, namely, about 70° F. as recited but a temperature of about 35° F.–105° F. is satisfactory.

The concentrates, whether in the form of the juice or the powder, and whether containing the diluent binder and flavor entrapping agent, such as gum acacia, have a very high flavoring strength, that of the whole product of Example 1 being naturally greater than the 80% product of Example 1a. In each case, however, the concentrate or powder has the very desirable and enhanced fresh garlic flavor.

In referring to the pulverization of the garlic bulbs while in frozen condition, we have in mind the use of temperatures well below 0° F., and in the foregoing examples the bulbs were broken up and pulverized at a temperature of 50° below zero.

The value of the low temperature condition of the garlic bulbs at the time of grinding and also when the centrifuging takes place with the pulverized garlic at a low temperature and in the presence of $CO_2$, which latter is optional, resides in slowing up the enzymatic action somewhat whereby to control the production of garlic flavor and reduce the rate of volatilization of odors and flavors which occur more rapidly at high temperatures.

In referring to high temperature short-time sterilization, we have used successfully temperatures from 240° F. for 16 seconds to 275° F. for 5 seconds.

In describing all the examples and their respective resultant products, it is to be significantly noted that the new powder or concentrate is different than that made by conventional methods, i.e., current dehydration is of the sliced garlic chips in which little to no enzyme activity has taken place. The chips, when reduced to powder or used as is, upon rehydration do not develop the same amount or kind of flavor components as resulting from our process. This difference is significantly apparent upon dilution taste tests and indicates a difference not only in strength but in type or quality of flavor, i.e., the new product is more like fresh macerated garlic. The qualitative and quantitative differences are also apparent in the amount of distillable, heavier-than-water garlic oil obtained from the new and conventional process, the new process yielding a higher oil content in the powder made from the same raw garlic. Also a distillable, water soluble fraction is obtained from the new product which forms a black precipitate upon the addition of lead acetate, and the conventional powder water soluble fraction does not do so, in the respective products as initially formed.

The ability to spray dry garlic powder of such highly esteemed quality is a new and unexpected result. Garlic has previously been spray dried, but with such poor results as to result in the abandonment of this approach in publications of texts, references, and periodicals.

Additionally, garlic powder made from conventional processing decreases in strength upon storage of powder, i.e., the steam distillable, heavier-than-water oil fraction decreases in amount upon storage of powder. However, our new powder does not do so.

The hot air is used in Examples 1g and 1h to dry and shrink the skin from the clove thereby facilitating its removal and the temperature and time may be as high as can be used as long as the garlic clove is not impaired.

*Example 3*

In another aspect of the invention it has been found that an improved and quicker enzymer reaction can be obtained if the garlic cloves are first placed in a fine state of dispersion, specifically if the cloves are broken down to a particle size which will pass through a 40 mesh sieve (Tyler series). By placing the garlic in a fine state of dispersion the enzymes can act more quickly and thoroughly. Preferably rapid agitation is employed since this exposes more substrate and fresh substrate to the enzyme action. The high speed agitation helps to disintegrate the cell walls of the clove and/or helps diffuse the enzyme into the substrate. It has been observed that there is much greater enzyme surface activity with the high speed agitation. The garlic puree is thus subjected to high shear agitation during the mixing with the cellulase enzyme.

Desirably the high speed agitation results in turbulence. Thus, garlic cloves can be cleaned at room temperature pureed and placed in a high speed agitator such as a Cowles Hi-Shear mixer having a speed of 590 to 1770 r.p.m. The depth of the vortex around the impeller shaft indicates the amount of turbulence. Using a 40 gallon dish bottom kettle with a 12 inch submersion on the impeller the depth of the vortex can normally be varied from 4 to 10 inches. In a specific example with the Cowles Hi-Shear mixer it was 8 inches. A cellulase enzyme, e.g., "Cellulase 35," as previously set forth, was incorporated with the puree in the mixer. After the reaction with the enzyme had occurred, the material was removed from the mixer and heated at 190–220° F. for 4–7 minutes, e.g., 200° F. for 5 minutes, to inactivate the enzyme, kill the bacteria and overcome the tendency of the puree to turn green. The product can then be used as a puree or it can be spray dried to a powder.

The purpose of breaking the puree down with cellulase enzyme in the high speed turbulent mixer is to reduce the viscosity in initially pumping the macerate and also to prevent a high viscosity in the product after cooling from the temperature of 190–220° F.

Instead of using pure cellulase enzyme there can be used cellulase enzyme mixed with other enzymes.

While the cloves were broken up at room temperature in Example 2 the cloves can be broken up at somewhat higher or lower temperatures. The enzyme digestion and agitation for example can be carried out at 115 to 130° F. to hasten the process.

We claim:

1. Process of lowering the viscosity of garlic puree passing through a 40 mesh sieve comprising treating the garlic puree with a cellulase enzyme for a time sufficient to effect a lowering of the viscosity while simultaneously mixing the puree by high shear agitation.

2. A process according to claim 1 including the addition step of heating the digested puree to a temperature of 190–220° F.

3. A process according to claim 2 wherein the digested puree is heated for 4–7 minutes at the temperature of 190–220° F. and is then cooled.

4. A product prepared by the process of claim 3.

5. A process of treating garlic puree passing through a 40 mesh sieve comprising treating the puree with a cellulase enzyme for a time sufficient to effect a lowering of the viscosity while simultaneously mixing the garlic puree in which the garlic particles have a particle size of less than 40 mesh by high speed turbulent agitation, stopping the agitation when the viscosity of the macerated mixture has been lowered, heating the macerated mixture to a temperature of 190–220° F. for 4–7 minutes to inactivate the enzyme and then spray drying the puree.

6. A garlic powder produced by spray drying the product of claim 4, said powder inherently containing not less than 0.2% steam distillable, heavier-than-water oil and a distillable, water soluble flavor containing fraction which forms a black precipitate on the addition of lead acetate.

7. A process of preparing garlic substance comprising macerating garlic cloves to pass through a 40 mesh sieve, heating the resultant puree to a temperature of about 140 to about 190° F., for about 5 to 30 minutes, cooling, digesting the puree with a cellulase digesting enzyme for a time sufficient to effect a lowering of the viscosity, and heating it to a temperature of 160 to 240° F. for two to ten minutes.

8. A process according to claim 7 in which an entrapping agent selected from the group consisting of gums, starches and dextrins, is added to the garlic substance to aid in the recovery of flavorful materials when the garlic substance is spray dried and thereafter drying said garlic substance.

9. A process of preparing a garlic concentrate which comprises breaking nonfrozen garlic bulbs into individual cloves, winnowing the latter in warm air, then separating the cloves from the roots and skins, cleaning the cloves, washing the cloves with water, grinding the cloves, digesting the resultant aqueous slurry with a cellulose digesting enzyme to reduce viscosity, heating the slurry at about 160 to 240° F. for about 2 to 10 minutes to destroy bacteria, and cooling to about 35 to 105° F.

10. A process according to claim 9 wherein the enzyme digestion takes place at a temperature of about 115 to 130° F. for about 10 to 40 minutes.

11. A process according to claim 9 wherein the winnowing is accomplished in warm air at a temperature of about 135 to 145° F.

12. A process according to claim 9 wherein the slurry is diluted with water and spray dried.

13. The process according to claim 9 comprising heating the puree formed by grinding the cloves in an enzyme digestion vapor tight vat to a temperature of about 140° to 190° F. for about 5 to 30 minutes, cooling, and digesting with said enzyme as described.

14. A process of preparing garlic substance comprising macerating garlic cloves, heating the resultant puree to a temperature of about 140 to about 190° F. for about 5 to 30 minutes, cooling, digesting the puree with a cellulose digesting enzyme, and heating it to a temperature of 160 to 240° F. for two to ten minutes.

15. A process according to claim 14 in which an entrapping agent selected from the group consisting of gums, starches and dextrins, is added to the garlic substance to aid in the recovery of flavorful materials when the garlic substance is spray dried and thereafter drying said garlic substance.

References Cited by the Examiner

UNITED STATES PATENTS

| | | | |
|---|---|---|---|
| 1,166,887 | 1/1916 | Chila | 99—140 |
| 1,800,501 | 4/1931 | Bornegg | 99—206 |
| 2,618,561 | 11/1952 | Spinka et al. | 99—140 |
| 2,760,869 | 8/1956 | Yanick | 99—140 |
| 2,957,771 | 10/1960 | Prater | 99—140 |

A. LOUIS MONACELL, *Primary Examiner.*

R. S. AULL, *Assistant Examiner.*